J. F. CRAVEN.
RECEPTACLE FOR CONTAINING AND DISCHARGING SEMISOLID AND PASTY SUBSTANCES.
APPLICATION FILED OCT. 14, 1910.

1,025,512. Patented May 7, 1912.

WITNESSES
Chas. Jockerman
Mary E. Cahoon

INVENTOR
James F. Craven
By Fred'k W. Winter
Attorney

UNITED STATES PATENT OFFICE.

JAMES F. CRAVEN, OF PITTSBURGH, PENNSYLVANIA, ASSIGNOR TO CRAVEN ENGINEERING COMPANY, OF PITTSBURGH, PENNSYLVANIA, A CORPORATION OF PENNSYLVANIA.

RECEPTACLE FOR CONTAINING AND DISCHARGING SEMISOLID AND PASTY SUBSTANCES.

1,025,512.

Specification of Letters Patent. Patented May 7, 1912.

Application filed October 14, 1910. Serial No. 587,083.

*To all whom it may concern:*

Be it known that I, JAMES F. CRAVEN, a resident of Pittsburgh, in the county of Allegheny and State of Pennsylvania, have invented a new and useful Improvement in Receptacles for Containing and Discharging Semisolid and Pasty Substances, of which the following is a specification.

This invention relates to a receptacle for containing, storing, transporting and discharging semi-solid and pasty substances.

The device is intended more particularly for putting up lubricants in the form of grease and discharging the same into the grease cups of machines so as to enable the grease to be supplied to the bearings without liability of dirt or grit entering the bearings with the grease and also to prevent smearing up or soiling the machinery or the hands of the user. The invention, however, is not limited to this particular use, but is adapted for putting up in a substantially sealed condition any semi-solid or pasty substances and delivering the same from the container in any desired quantity or quantities.

The invention comprises the construction and arrangement of parts hereinafter described and claimed.

Figure 2:
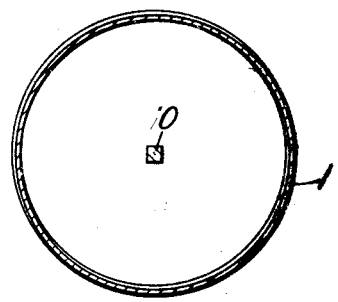
Figure 1:
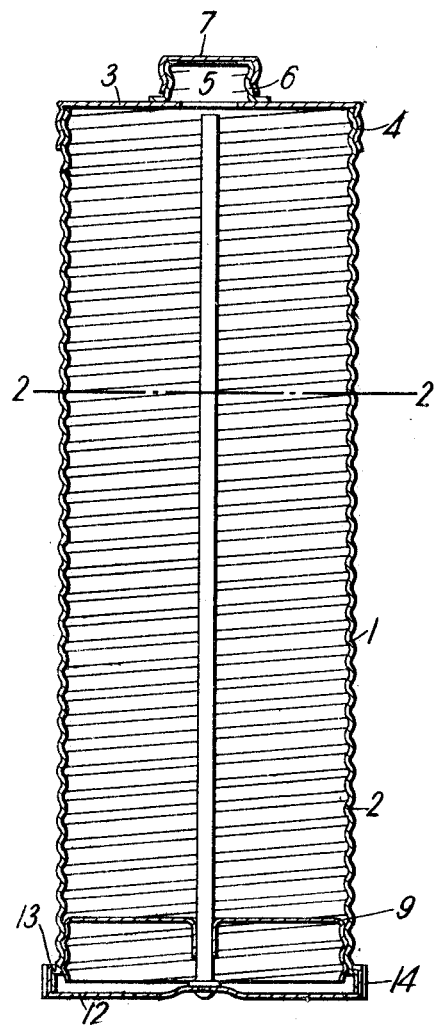

In the accompanying drawing Figure 1 is a vertical section through the improved device; and Fig. 2 is a horizontal section on the line 2—2, Fig. 1.

The receptacle or container may be made of any desired size or shape and may be constructed or built up in any desired way or from any desired material. As shown in the drawings the receptacle is formed by a substantially cylindrical tube 1 which preferably is formed of sheet or other suitable metal, or other substance capable of having its walls formed into or provided on the interior with the threads 2. One end of this receptacle is closed by means of the cap or head 3, which preferably is removable such as by having a threaded connection with the body at 4, for convenience in filling the receptacle with the desired material. This head is provided with the discharge orifice 5 which preferably is formed in an extension 6 from the head or cap, which extension is externally threaded to receive the screw cap 7 forming a closure, and which threaded projection may also have screwed thereon a delivery spout if desired.

The substance is forced from the receptacle through the delivery orifice by means of a piston or follower 9 which is longitudinally movable therein, such as by having its periphery threaded and engaging the threads on the interior of the tube or receptacle 1, so that when said piston is rotated it moves longitudinally in said tube. For the purpose of rotating the piston there is shown a rod 10 of square or other non-circular form having a sliding fit in a similarly shaped hole through the piston 9. This rod will be so mounted as to be longitudinally immovable, but rotatable so that when turned it turns the piston and thereby causes the latter to travel longitudinally in the tube. Various means for holding and turning the rod 10 may be employed. As shown, said rod is secured to a cap 12 which forms a closure for the end of the receptacle opposite its discharge end, and which cap is rotatably mounted but longitudinally immovable on the tube 1, such as having its edge crimped around a flange or shoulder 13 on the body. Preferably the annular edge of said cap is knurled or milled, as at 14, to give a good grip for the fingers to rotate the same. It is obvious that when the cap 12 is rotated the piston 9 is also caused to turn, and on account of its threaded engagement in the interior of the tube travels longitudinally in the latter thereby forcing the grease or other substance out through the discharge orifice.

The receptacle is filled either through the discharge orifice 5 or by removing the cap 3. It is filled with the substance at the factory and is then closed by means of cap 6 so that it is practically sealed. In this condition it can be packed, shipped and stored without danger of dirt or grit getting into the contents. There are no projecting portions beyond the receptacle proper to interfere with the storing and transportation thereof.

In use the closure 6 is first removed, after which the body of the receptacle is grasped by one hand and the cap 12 or similar means turned with the other hand, thereby causing the piston to travel longitudinally and forcing the substance out of the receptacle.

This operation can be readily performed so that it is possible to accurately gage the quantity of material forced out of the receptacle and also preventing the soiling of the user's hands.

Various other means than the cap 12 may be provided for rotating the operating rod 10, as will be readily apparent.

What I claim is:

1. A device of the character described comprising a thin light tube spirally corrugated to provide internal threads, a cap closing one end of said tube and provided with a discharge orifice, a piston or follower threaded on its periphery and engaging the internal threads in said tube, means longitudinally immovably mounted in said tube and having a sliding fit with said follower, and an imperforate end closure at the opposite end of the said tube arranged for rotating said means to cause the piston to discharge the contents from the discharge orifice.

2. A device of the character described comprising a thin light tube spirally corrugated to provide internal threads, a cap closing one end of said tube and provided with a discharge orifice, a piston or follower threaded on its periphery and engaging the internal threads in said tube, an imperforate cap closing the opposite end of the tube and being rotatable but longitudinally immovably mounted thereon, and a rod secured to said cap and extending into the tube, said follower having a sliding and driving connection with said rod.

In testimony whereof, I have hereunto set my hand,

JAMES F. CRAVEN.

Witnesses:
F. W. WINTER,
SUE B. FRITZ.